United States Patent Office 3,431,735
Patented Mar. 11, 1969

3,431,735
POWERPLANTS AND WATER SUPPLY SYSTEM
THEREFOR WITHIN THE ETERNAL ICE
Hans Stauber, Witikonerstrasse 65, Zurich, Switzerland
Filed Oct. 5, 1964, Ser. No. 401,595
Claims priority, application Germany, Oct. 9, 1963,
St 21,164
U.S. Cl. 61—19                                   14 Claims
Int. Cl. E02b 9/00, 3/00; E03b 1/00

The present invention relates to the erection of powerplants and the development and installation of a water supply system within the area of the "eternal" ice of glaciers for the operation of such plants, preferable for generating electric energy.

Prior to the invention it has only been possible to build hydroelectric powerplants and the entire water supply system therefor within areas in which the climatic conditions permit the water to be directly collected in artificial reservoirs at higher elevations from which it was then supplied by gravity to the turbines of the powerplants at lower elevations. If the water for filling such a reservoir was derived from the melted ice and snow of a glacier, this water was conducted to the reservoir from the mouth of the glacier in the natural bed of a brook. It has so far not been possible to erect such powerplants within or near the "eternal" ice because there was no method known in which the water which was melted during the warmer season from the ice and snow of a glacier could be collected and guided in the desired directions toward reservoirs from which it could then be conducted to a powerplant.

Extensive investigations which have been carried out in glacier areas have shown that near the edges of glaciers there are often a series of small ice-bound pools and lakes which are automatically drained after a period of considerable precipitation, especially during the month of September. During strong rain storms these relatively small depressions in the ice are quickly filled and the natural ice walls around the depressions start to float on the water which flows away underneath the ice walls.

It is an object of the present invention to provide a method of utilizing the extremely large amounts of energy which become available during the summer within the area of the "eternal" ice by providing collecting and draining channels as well as reservoirs by very simple means and at a low cost of installation at the most suitable position, and by connecting these reservoirs to powerplants for the purpose of generating electric energy.

According to the invention this object is attained by forming a water reservoir within the glacier ice either by employing a natural basin which is formed in the glacier ice or by forming or enlarging such a basin artificially, by connecting the bottom of such a reservoir to a downwardly extending gravity pressure line or conduit, and by merely marking a system of collecting and draining channels by very simple means on the surface of a glacier at a higher location than the reservoir and in such a manner that during the warmer periods of the year the radiation of the sun, the heat transfer from the water and/or the erosion by the flow of water will automatically, i.e., naturally, deepen and widen these channels as well as the reservoir.

For forming such a reservoir, it is, of course, advisable to employ a natural basin in the ice, the side of which facing toward the lower end of the glacier is bordered on or located near a natural rock wall so that the latter will form a dam for the reservoir. The reservoir may according to the invention be easily enlarged by relatively simple technical means. It is merely necessary only once to melt the walls and bottom of the available depression in the "eternal" ice by the radiation of the sun and/or by suitable heating means until the reservoir is of the desired size. This may be done either continuously or intermittently. Especially for the original formation of such a reservoir it is advisable to employ the heat derived from nuclear fission or from other fuels, while after a first powerplant has been erected and in operation, a part of the electric energy generated may be used for enlarging the reservoir or for melting additional reservoirs out of the ice. An important feature of the invention is the fact that, after a reservoir has once been melted out of the ice, it will remain operative for an indefinite length of time. This is due to the fact that even at a considerable depth of the glacier ice the temperatures are hardly ever lower than approximately −20° C. and that the amounts of water which are collected in a reservoir which has been artificially formed by melting out the glacier ice to the desired size of the reservoir will not even freeze during the cold season of the year because only a superficial layer of ice of a thickness of 1 to 2 meters will then form on the water in the reservoir which constitutes an excellent insulation for the water even at very low outer temperatures. It has further been found that the danger that the water in the reservoir might freeze in the direction from the solid ice bottom thereof is very small since the large amounts of water which are collected in the reservoir will cool off only very slowly.

In order to be able to supply this reservoir during the warmer period with sufficient water from melted ice and snow to render the generation of electric current economical, it is necessary to form a watershed in which the water may be collected during this period and conducted to the reservoir. It is an important object of the invention to form and maintain such a watershed at such a low cost and with such simple and inexpensive means that the investments for erecting large hydroelectric powerplants will be fully justified and electric power may be generated at a low cost.

This may be attained according to the invention by merely marking a system of water channels on the surface of the glacier ice at the most suitable locations thereof by depositing thereon dark substances or elements which absorb the heat of radiation of the sun which is then transmitted to the surface of the ice. Such dark means may consist, for example, of black hose of plastic, dark mats, or the like, or even of soot and/or crushed rock and gravel from the surrounding mountains. When these means are deposited on the surface of the ice during the summer, the heat transmitted therefrom forms at first only very shallow water channels which are subsequently enlarged and deepened automatically by the erosion and the heat transfer of the water running therethrough. During the following winter these channels will only be filled loosely with snow which during the next warmer season will melt and run through the channels together with other water collected from the melted snow of the surrounding area and will thereby enlarge the channels to a still greater width and depth. After a few years a state of equilibrium will occur between the width and depth of the channels and the gradient thereof, the amount of precipitation by rain and snow, and the layer of ice which is formed by the low outer temperatures.

In this manner it is possible by the formation of a channel system which originally only needs to be marked on the ice by relatively simple technical means, and by the formation of a reservoir which only needs to be melted out once from the glacier ice by the use of additional heat, to produce in the summer a considerable supply of water for this artificially made reservoir which cannot freeze up even during the cold periods of the year and can therefore also be used as a reservoir during the winter. Even if it should occur that this reservoir runs completely dry during the winter, in which case a large empty cavity remains which is covered by a layer of ice which may have a thickness of 1 to 2 metres depending upon the prevailing temperature conditions, and also may collapse, the reservoir will during the following warmer period again be filled with water which is melted from the ice and snow of the glacier and collected and supplied to the reservoir by the channel system which is formed artificially in accordance with the invention. Also in this case a state of equilibrium will gradually occur between the depth and capacity of the reservoir and the amounts of water supplied thereto. The length of time until this will occur depends upon the prevailing climatic conditions and the particular conditions within the area which serves as a watershed for the collecting channels and the reservoir. The amount of water which may be supplied to the reservoir may be increased in a similar manner in which the collecting channels are originally formed, namely, by covering at least parts of the area of the ice which forms the watershed with dark substances or elements which absorb the heat radiated by the sun, for example, with soot and/or with crushed rock and gravel from the surrounding mountains or with dark parts of plastic.

The various features and advantages of the present invention will become more clearly apparent from the following detailed description thereof which is to be read with reference to the accompanying drawings in which:

FIGURE 5 shows a diagrammatic illustration of the method in which the reservoirs and water channels may be formed; while

The present invention will be hereafter described in detail with reference to southern Greenland because investigations have shown that the ice masses in that area are especially suitable for the erection of a hydroelectric powerplant in the "eternal" ice in accordance with this invention. It is, however, to be understood that such power plants may also be erected in many other areas in different parts of the world where similar conditions prevail as in southern Greenland. The conditions in southern Greenland are especially favorable due to the fact that this area contains extremely large masses of inland ice, that these extensive ice fields are located at a relatively high elevation above sea level, and that the water for the operation of the hydroelectric plant is therefore derived from melted ice and snow from a large area or watershed. Southern Greenland also has certain climatic advantages since it is located within the area of greatest precipitation in Greenland and also south of the Arctic Circle where relatively high temperatures prevail in summer so that considerable amounts of snow and ice are melted. Due to its particular geographic location, southern Greenland also offers an excellent possibility for erecting numerous powerplants at different points near the coast and for connecting them with each other via the inland ice and for then conducting the total energy generated to the southern tip of the island from which it may be further conducted at a relatively low cost to the consumer countries in Europe and America.

Figure 1:
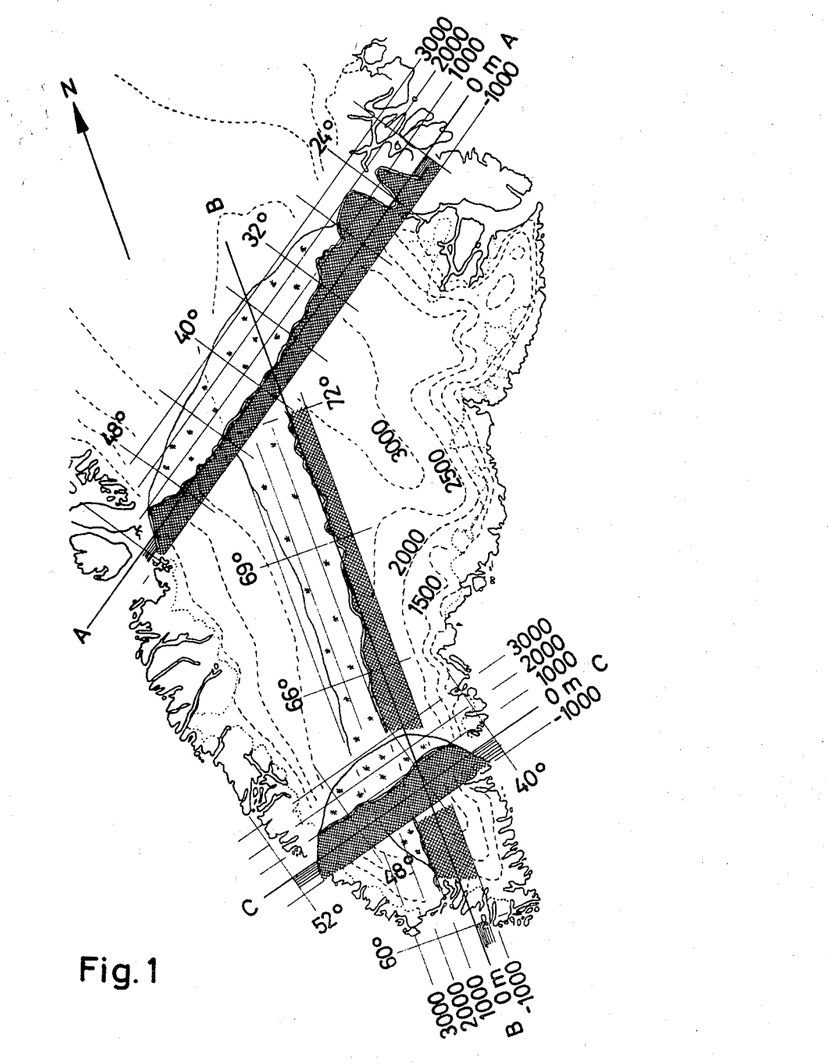
FIGURE 1 shows a general plan view of southern Greenland including the fiord areas and the inland ice thereof, and within this plan view, two cross-sections and one longitudinal section thereof.

As may be seen in FIGURE 1, the mountains have an average height of 1000 meters and at some points up to 2000 meters. The mass of inland ice on these mountains reaches a height of up to 3000 meters above sea level. Thus, there is a sufficient gradient to permit the entire water from the melted snow and ice to be utilized in powerplants which are located approximately at sea level. The longitudinal section B-B and the two cross sections A-A and C-C which are drawn into the plan view of FIGURE 1 illustrate the hugh dimensions of the mountains and especially of the inland ice resting thereon. These sectional views also indicate that at the interior of southern Greenland there is a very extensive mass of ice which is practically immovable and only leads within the areas near the coast to the formation of numerous fiords. The most suitable points for combining the natural channels for the melted snow and ice which are formed during the summer months and the artificial ones which are to be built according to the invention are within the marginal zone between the practically stationary inland ice and the areas near the coast where the ice breaks up toward the fiords. The indications in FIGURE 1 of the latitudes from 60° north to 72° north also reveal the tremendous size of the area of the inland ice, while the level lines indicate the relatively small inclination of the inland ice which facilitates the collection of the water which is formed from the melted snow and ice, and the manner of conducting this water to the power plants near sea level. The cross-sectional view A-A in FIGURE 1 further shows that a part of its sides facing the coast, the mass of inland ice is bordered by natural rock. Such places are especially suitable for building water reservoir since natural dams are already available and it may sometimes only be necessary by supplying artificial heat to melt the ice in a ravine which is already formed within the ice.

Figure 2:
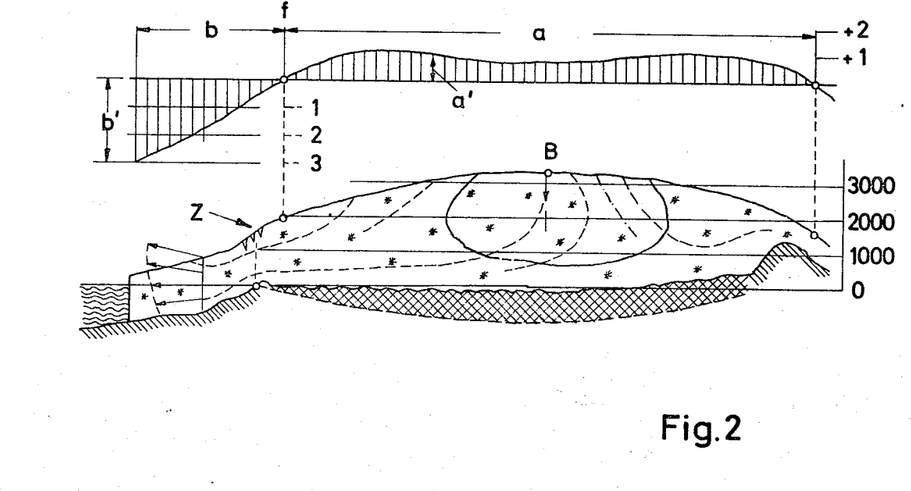
FIGURE 2 shows a diagrammatic illustration for explaining the inland ice theory.

FIGURE 2 shows by diagrammatic cross sections of southern Greenland the findings of modern glacier research concerning the zones of accumulation and ablation. In these drawings, the ablation area is indicated at $b$, while the area of growth of the firn, that is, the accumulation zone, in indicated at $a$. The amount of ice melting each year is indicated in meters at $b'$, while the average annual growth of the glacier ice is likewise indicated in meters at $a'$. FIGURE 2 further illustrates that the melting zone lies above the crevasse area at a height of approximately 2000 meters above sea level. This point, indicated at F, is the position or elevation which is most suitable for starting the water collecting channels which are to be built according to the invention. The dotted lines at the right and left of the point B, the movement divide, indicate the direction of movement of the ice masses from this point. B. These ice currents which comply with the theory according to which movement of the inland ice is to be regarded as a deformation of a highly viscous fluid the apparent viscosity of which changes from one point to another, are being constantly examined. Consequently, when searching for a suitable location for erecting a hydroelectric powerplant which is operated by the water from melted ice and snow, it is also possible to resort to the most recent reports of such research.

Figure 3A:
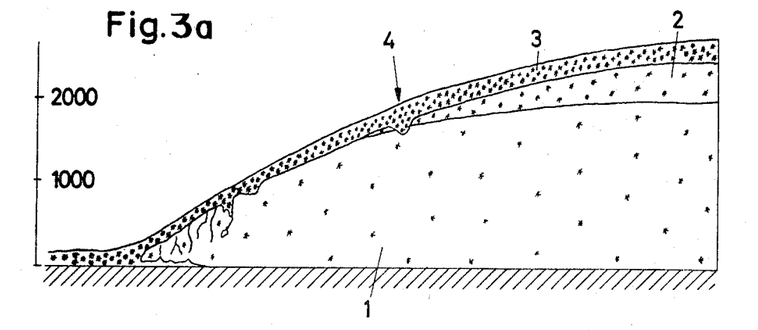
FIGURE 3a, 3b, and 3c illustrate the accumulation and ablation of the inland ice.
Figure 3B:
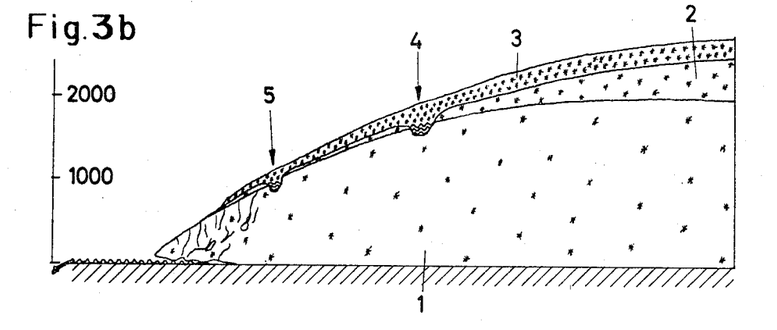
Figure 3C:
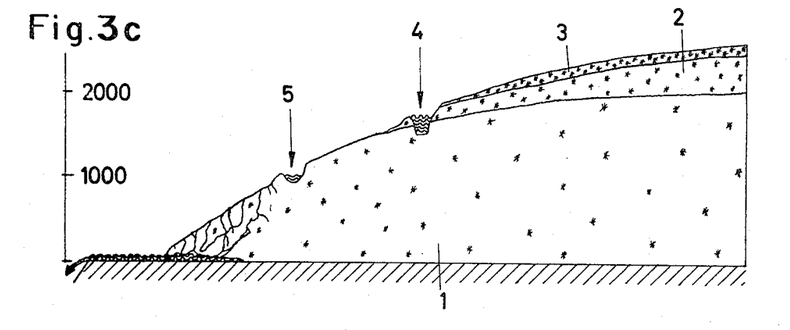

FIGURES 3a, 3b, and 3c show diagrammatic illustrations of the boundary zone between the accumulation and ablation of the inland ice during the different seasons which has been determined by glacier research and is of particular interest for the purposes of the invention. FIGURE 3a shows the solid glacier ice 1, the firn 2 within the accumulation zone, and above the latter the blanket of snow 3 which in the winter extends downwardly to the sea level. A channel 4 which is formed merely by heat-absorbing substances will, during the winter months, be filled out and covered only by the loose blanket of snow 3.

FIGURE 3b shows the same cross-section through the marginal zone of the inland ice, but during the summer period from June to August. The snow blanket 3 then melts off very quickly and the firn 2 covering the solid inland ice 1 also melts within the marginal zone between accumulation and ablation to form pools from which the water may be collected and conducted in the desired directions. For this purpose, FIGURES 3a, 3b and 3c indicate two collecting channels 4 and 5 which extend vertically to the plane of these drawings and are adapted to collect the water from the melted snow and ice. From these channels 4 and 5 the water is then conducted to a reservoir and thence to the powerplants. According to the invention these collecting channels do not actually have to be built but it suffices if they are merely marked once in the surface of the ice by heat-absorbing substances. During the warmer period, these channels 4 and 5 will then be widened and deepened automatically by the water flowing along them until a state of balance is formed between the water flowing into and through the channels and their cross-sectional size.

FIGURE 3c illustrates the end of the ablation period and indicates the drainage effect of the upper collecting channel 4 which insures that the pools of water which are formed on the firn 2 and in the blanket of snow 3 will actually be drained off and conducted away for the purposes as intended. The lower collecting channel 5 is designed to prevent as much as possible that the water might seep away into crevasses or the like so as to insure that nearly the entire water from the melted now and ice may be utilized for generating electric power.

Figure 4:
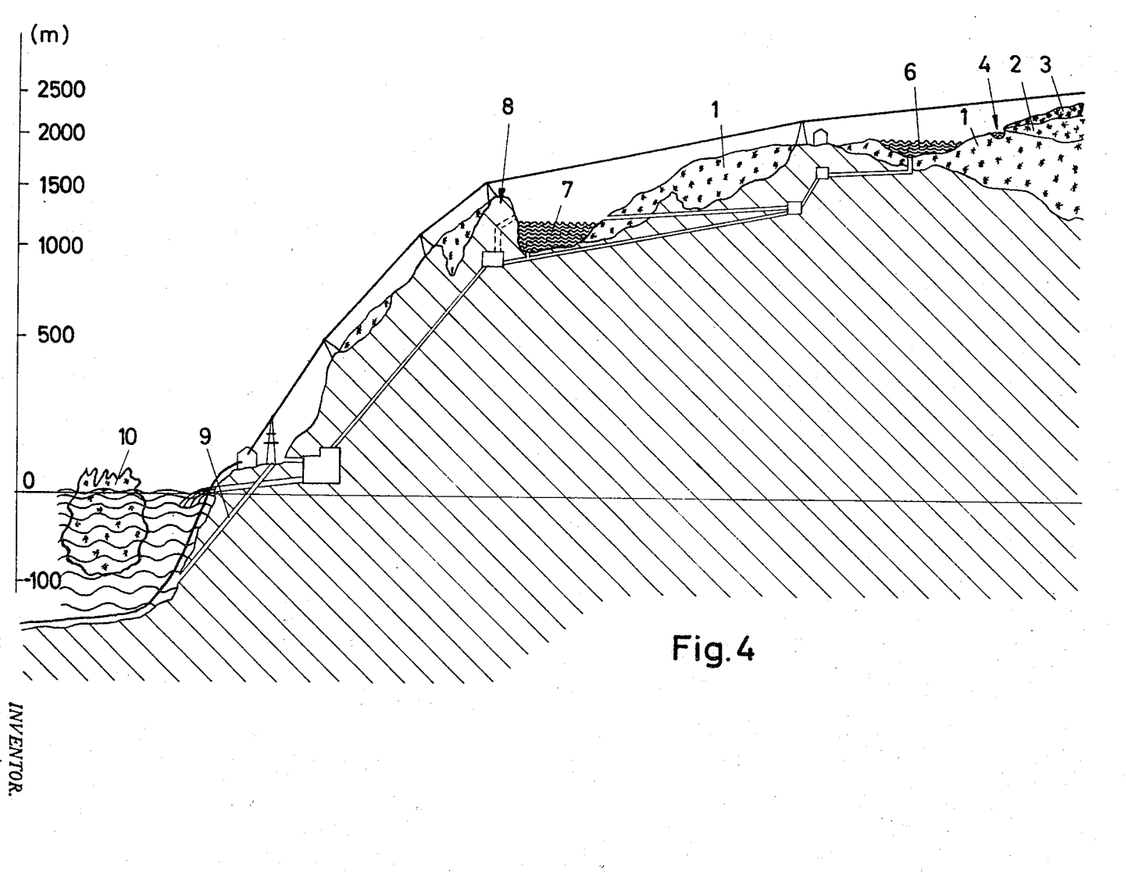
FIGURE 4 shows a diagrammatic illustration of a powerplant according to the invention including the channel and reservoir system.

FIGURE 4 shows a diagrammatic illustration of a powerplant including the reservoir and channel system, in which the inland glacier ice is again indicated at 1, the firn covering the latter at 2 and the snow blanket at 3. The collecting channel 4, the formation of which is at first started merely by marking the course of the channel by heat-absorbing substances on the surface of the ice and which is subsequently enlarged automatically is shown at a height of approximately 2200 meters above sea level. At a slightly lower level, an artificial water reservoir 6 is formed within the inland ice 1 from which the accumulated water is conducted through a conventional surge tank and pressure lines to a further reservoir 7 which is located at a height of approximately 1300 meters and provided with a natural rock wall 8. From this reservoir 7 the water then flows through another surge tank and pressure line to the actual powerplant which is located approximately at sea level. Of course, an intermediate power station may also be provided between the upper reservoir 6 and the lower reservoir 7 both of which may, for example, be formed naturally and be artificially enlarged.

The reservoir 6 may be formed in the inland ice by relatively simple technical means. For this purpose, it is merely necessary to melt a suitable spot of the inland ice 1 to an extent sufficient to form a shallow basin in which the water may be collected during the summer. The amount of water which is allowed to drain from the reservoir 6 through the pressure line to the lower reservoir 7 or directly to the powerplant may be easily regulated by simple means so as to be in a proper proportion to the amount of water which is continuously added to the reservoir from the melted snow and ice so that, after this water has enlarged the original trough to a reservoir of the desired size and capacity, the volume of water in the reservoir 6 will thereafter remain substantially constant.

If a hydroelectric powerplant which is operated by melted snow and ice is erected in an area such as described, that is, for example, in southern Greenland, there is still one problem to be considered, namely, to find the most suitable manner of conducting away the electric energy which has been generated.

As illustrated in FIGURE 4, a bore 9 may for this purpose be drilled into which a cable may be inserted which leads from a point on the coast to a point deeply below the surface of the sea from which it is then continued in the form of an ocean cable along the bottom of the sea. In this manner there will be no danger that the cable might be damaged by icebergs 10 which might float around this area. Another possibility of conducting away the electric energy consists in utilizing the bore or bores for the high-pressure water lines for also passing the power cable upwardly in the direction opposite to the water current and up to the inland ice 1, and in then passing the cable along the inland ice 1 to a suitable point from which it may lead downwardly to a point on the coast where it may be connected to an ocean cable or where the electric power may be utilized directly. A third possibility consists in employing the necessary masts of the aerial cableways for the transportation of loads for also supporting the power cables and leading them to a point on the inland ice 1 from which they may then be passed without masts along the ice and then downwardly to a suitable location on the cost. Such a manner of passing the power cable to the most suitable point by laying it directly upon the inland ice has the additional advantage that, if the outer insulation of this cable is made of a black color so as to absorb the heat of the sun, it will melt the solid ice sufficiently to form new gutters in which the water from melted snow and ice will collect and which will be enlarged by the subsequent flow of water.

For transporting the necessary material to the different points where it is required for building the new power system, an aerial cableway and a sled cableway may be erected which lead from a suitable harbor to the height of the inland ice 1 from which the material may then be further transported by sleds.

The aerial and sled cableways may also be combined, in which case the cable car may be equipped with skids and be pulled upwardly along those areas of the inland ice which are only slightly inclined. The distances between the masts within these areas may then be considerably larger than those over which the loads have to be carried through the air.

Figure 5:
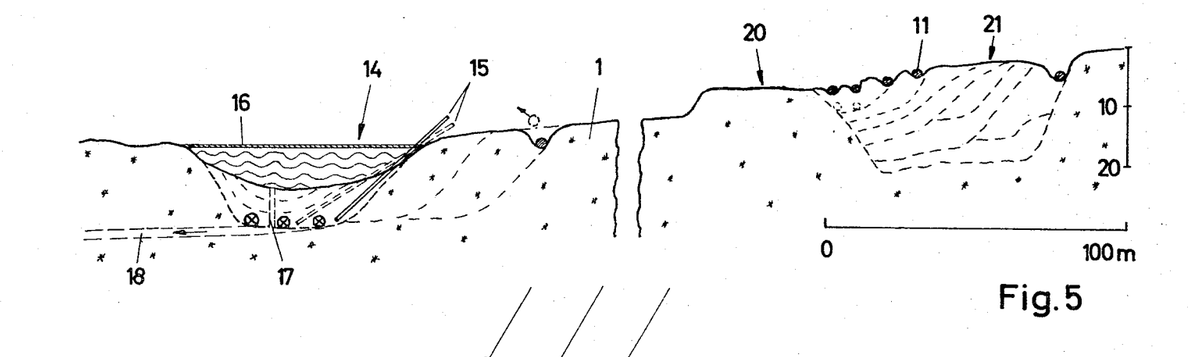

FIGURE 5 illustrates at the right side the manner in which a water channel 21 may be formed, for example, at the border zone between the accumulation and ablation areas. It suffices if for this purpose suitable heat-absorbing means, for example, in the form of black hose 11 of plastic, are deposited on the firm surface in a manner so as to indicate thereon the course which the water from the melted ice and snow should follow to form the subsequent water channel 21. The heat transmitted by these heat-absorbing means then forms at first a collecting channel of a very small cross-sectional size which is subsequently increased in depth and width by erosion and heat transfer by the water flowing through this channel. By depositing several black hose adjacent to each other or by rolling out black mats, the formation of the water collecting channel may be speeded up considerably until a natural state of equilibrium is reached between the cross-sectional size of the channel and the amount of water which can be collected from the available watershed on the inland ice. The heat-absorbing means, for example, the plastic hose 11, are then no longer required and may be removed for use at another location. By a controlled operation of melting out a collecting channel 21 it is also possible for example, to form a dam 20 which may be used as a road for sleds and full-track vehicles.

Figure 6:
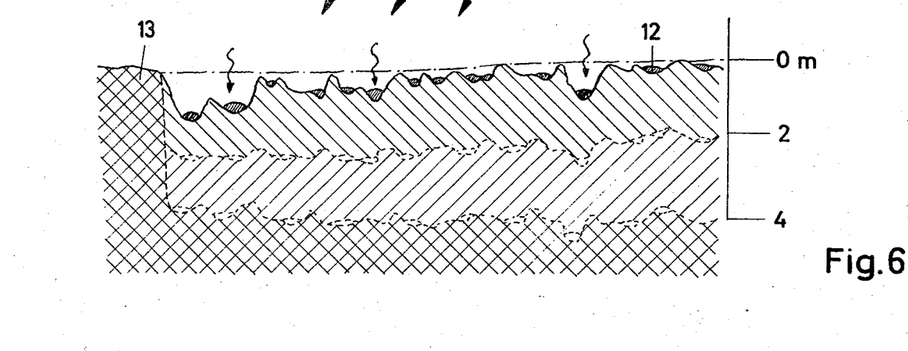
FIGURE 6 illustrates the thawing effect attained by depositing heat-absorbing means upon the ice.

FIGURE 6 illustrates how it is possible, for example, by spreading pieces of soot 12 of the like on the ice surface which are heated up by the radiation of the sun to melt down the ice cover 13 every year about 1 to 2 meters. The soot may also be mixed with crushed rock and fine gravel from the surrounding mountains or the latter may even be used alone. In this manner it is possible to melt a large area of ice and snow and thus to increase considerably the amount of water which may be collected.

For "building" a reservoir 14 in the inland ice 1, it is advisable to resort, if possible, to a depression which is already existing in the glacier. By depositing electric heating elements 15 on or in the inland ice 1 it is possible to control the capacity of the reservoir 14 so as to be in accordance with the available area of the watershed and the amount of water which may be collected therefrom. Of course, for increasing the size of the reservoir 14 and especially for its original formation it is also possible to employ the heat derived from atomic energy.

During the winter season the surface of the reservoir 14 will be covered by a layer of ice 16 which may increase up to 2 meters depending upon the particular geographic location. This layer of ice forms an excellent heat insulation so that even during the coldest period large quantities of water will remain liquid in the reservoir and may be utilized for generating electric energy. It may, however, happen that due to the continuous drainage, the reservoir 14 will run dry completely and will not even fill up with snow because of the cover 16 of winter ice. A freezing of the water contained in the reservoir proceeds, however, very slowly since it is protected from the low outside temperatures by the insulation furnished by the ice cover 16. In the event that the reservoir 14 is completely drained of water, this period may be used for instilling heating elements for further enlarging the reservoir or for making any repairs which may have become necessary. Even if the ice cover 16 should collapse after the water has been drained out of the reservoir, the latter will remain and it will continue its function as soon as at the beginning of the warmer period the water flowing into it through the channels from the watershed on the inland ice will again start its natural erosion and melting process. This also applies to the premarked water channels which also remain during the cold season and are then merely filled loosely by newly fallen snow.

The lowest point of the reservoir 14 which may either be formed naturally in the inland ice 1 or by means of heating elements is preferably first provided with a vertical bore 17 through which the water may pass to and then along a bore through the ice which is slightly inclined in the downward direction and leads to a conventional rock-walled reservoir 7 from which the actual pressure line then leads to the powerplant near sea level. Of course, the boreholes in the rock and in the ice must be constructed and made of diameters in accordance with the prevailing local conditions and, if necessary, be lined by rock or concrete walls, unless pipelines are inserted therein.

The project of generating energy according to the invention as described with reference to its location on the southern tip of Greenland may, of course, be enlarged by erecting a series of powerplants along the eastern and western coasts and by connecting them to a common main which is layed along the inland ice and leads to a convenient location, for example, on the southern tip of Greenland from which the entire current from all powerplants may then be conducted by ocean cables to Europe or America. The water collecting channels may, of course, also be conducted on the inland ice along the eastern and western coasts of southern Greenland to its southern tip where a single large powerplant may be erected. It is also to be understood that the present invention of building a hydroelectric power system is by no means limited to Greenland, but may be erected wherever "eternal" ice is located and where the climatic conditions are such that during the summer, larger quantities of water are melted from the snow and ice, and where the differences in elevation between different points are so large that the water collected by collecting channels and reservoirs according to the invention may be utilized for economically generating electric power and possibly also for other purposes. The essence of the invention consists in making practical use of the scientific finding that channels and reservoirs for collecting and conducting water which is derived from melted snow and ice merely need to be marked and started on the ice by very simple means and will then increase in size either automatically by the natural conditions of the flow of water or by the aid of very simple and inexpensive means until they reach a state of equilibrium which may then be maintained for years practically without any new effort and without danger that the collecting channels or the reservoirs will again be filled up with ice. The possibility of artificially heating the water collecting channels and reservoirs also permits them to be made of the most suitable size and capacity in proportion to the area of the watershed and the supply of water therefrom. Actual tests have shown that the energy consumption required for such heating is extremely low in comparison with the energy which may be produced. This fact constitutes the basis of the great commercial value of the invention which consists of forming water collecting channels within the area of the inland ice and reservoirs within the zone between the accumulation and ablation areas in the "eternal" ice.

Regarding the scientific basis of the present invention, reference is made to the paper of the inventor read by him in October 1963 at the Polar Convention at Karlsruhe, Germany, and entitled "Accumulation and Ablation of High-Alpine Glaciers at Sub-Polar Temperatures and Possibilities of Utilizing the water From Melted Snow and Ice for Operating Power Plants." This paper will also be published in the journal "Polarforschung," published by the Deutsche Gesellschaft für Polarforschung, and in the Deutsche Archiv für Polarforschung, published by the Weserlandverlag at Holzmiden, Germany.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A method of developing and erecting a powerplant and a system for collecting the water for the operation of said plant within the area of the eternal ice of glaciers, comprising the steps of forming a water-containing reservoir in the eternal ice, extending a gravity pressure conduit from said reservoir to said plant located at a lower level than said reservoir, and forming in the surface of the ice within an area above said reservoir a system of shallow channels for collecting the water from melted ice and snow and establishing a gravity flow within said channels for conducting said water of said system to said reservoir, said reservoir and said channels being deepened and enlarged during the warmer season by heat from solar radiation, by the erosion by the flow of water, and by the heat transfer from said water, thereby increasing the flow of water conducted to said reservoir.

2. A method of developing and erecting a powerplant and a system for collecting the water for the operation of said plant within the area of the eternal ice of glaciers, comprising the steps of forming a water-containing reservoir within the eternal ice of a glacier at a location in which one side of said reservoir facing in the direction toward lower levels substantially borders on a mountain adapted to serve as a dam for said reservoir, connecting said reservoir by a gravity pressure conduit to said plant located at a lower level than said reservoir, and forming in the surface of the ice within an area above said reservoir a system of shallow channels for collecting the water from melted ice and snow and establishing a gravity flow within said channels for conducting said water to said reservoir, said reservoir and said channels being deepened and enlarged during the warmer season by heat from solar radiation, by the erosion by the flow of water, and by the heat transfer said water, thereby increasing the flow of water conducted to said reservoir.

3. A method of developing and erecting a powerplant and a system for collecting the water for the operation of said plant within the area of the eternal ice of glaciers, comprising the steps of forming a water-containing reservoir within the eternal ice of a glacier, by melting said reservoir out of said eternal ice by heat produced by solar radiation, extending a gravity pressure conduit connecting said reservoir with said plant located at a lower level than said reservoir, and forming in the surface of the ice within an area above said reservoir a system of shallow channels for collecting the water from melted ice and snow and for establishing a gravity flow conducting said water to said reservoir, said reservoir and said channels being deepened and enlarged during the warmer season by heat from solar radiation, by the erosion by the flow of water, and by the heat transfer from said water, thereby increasing the flow of water conducted to said reservoir.

4. A method of developing and erecting a powerplant and a system for collecting the water for the operation of said plant within the area of the eternal ice of glaciers, comprising the steps of forming a water-containing reservoir within the eternal ice of a glacier, by melting said reservoir out of said eternal ice by electric heating means, connecting said reservoir by a gravity pressure conduit to said plant located at a lower level than said reservoir, and forming in the surface of the ice within an area above said reservoir a system of shallow channels for collecting the water from melted ice and snow and for establishing a gravity flow conducting said water to said reservoir, said reservoir and said channels being deepened and enlarged during the warmer season by heat from solar radiation, by the erosion by the flow of water, and by the heat transfer from said water, thereby increasing the flow of water conducted to said reservoir.

5. A method of developing and erecting a powerplant and a system for collecting the water for the operation of said plant within the area of the eternal ice of glaciers, comprising the steps of forming a water-containing reservoir within the eternal ice of a glacier, by melting said reservoir out of said eternal ice by heat derived from nuclear fission, connecting said reservoir by a gravity pressure conduit to said plant located at a lower level than said reservoir, and forming in the surface of the ice within an area above said reservoir a system of shallow channels for collecting the water from melted ice and snow and for establishing a gravity flow conduciting said water to said reservoir, said reservoir and said channels being deepened and enlarged during the warmer season by heat from solar radiation, by the erosion by the flow of water, and by the heat transfer from said water, thereby increasing the flow of water conducted to said reservoir.

6. A method of developing and erecting a powerplant and a system for collecting the water for the operation of said plant within the area of the eternal ice of glaciers, comprising the steps of forming a water-containing reservoir within the eternal ice of a glacier, by melting said reservoir out of said eternal ice by heat produced by the combustion of fuels, connecting said reservoir by a gravity pressure conduit to said plant located at a lower level than said reservoir, and forming in the surface of the ice within an area above said reservoir a system of shallow channels for collecting the water from melted ice and snow and for establishing a gravity flow conducting said water to said reservoir, said reservoir and said channels being deepened and enlarged during the warmer season by heat from solar radiation, by the erosion by the flow of water, and by the heat transfer from said water, thereby increasing the flow of water conducted to said reservoir.

7. A method of developing and erecting a powerplant and a system for collecting the water for the operation of said plant within the area of the eternal ice of glaciers, comprising the steps of forming a water-containing reservoir within the eternal ice of a glacier, by employing a depression existing in said eternal ice and by increasing the size and depth of said depression by the application of heat, connecting said reservoir by a gravity pressure conduit to said plant located at a lower level than said reservoir, and forming in the surface of the ice within an area above said reservoir a system of shallow channels for collecting the water from melted ice and snow and for establishing a gravity flow conducting said water to said reservoir, said reservoir and said channels being deepened and enlarged during the warmer season by heat from solar radiation, by the erosion by the flow of water, and by the heat transfer from said water, thereby increasing the flow of water conducted to said reservoir.

8. A method of developing and erecting a powerplant and a system for collecting the water for the operation of said plant within the area of the eternal ice of glaciers, comprising the steps of forming a water-containing reservoir within the eternal ice of a glacier, connecting said reservoir by a gravity pressure conduit to said plant located at a lower level than said reservoir, and depositing means of a dark outer color and capable of absorbing heat from solar radiation upon parts of the surface of said eternal ice within an area above said reservoir for transmitting said heat to said parts so as to melt out shallow channels for collecting the water from melted ice and snow and for establishing a gravity flow conducting said water to said reservoir, said reservoir and said channels being deepened and enlarged during the warmer season by heat from solar radiation, by the erosion by the flow of water, and by the heat transfer from said water, thereby increasing the flow of water conducted to said reservoir.

9. A method for developing and erecting a powerplant and a system for collecting the water for the operation of said plant within the area of the eternal ice of glaciers, comprising the steps of forming a water-containing reservoir within the eternal ice of a glacier, connecting said reservoir by a gravity pressure conduit to said plant located at a lower level than said reservoir, and depositing black hose capable of absorbing heat from solar radiation upon parts of the surface of said eternal ice within an area above said reservoir for transmitting said heat to said part so as to melt out shallow channels for collecting the water from melted ice and snow and for establishing a gravity flow conducting said water to said reservoir, said reservoir and said channels being deepened and enlarged during the warmer season by heat from solar radiation, by the erosion by the flow of water, and by the heat transfer from said water, thereby increasing the flow of water conducted to said reservoir.

10. A method of developing and erecting a powerplant and a system for collecting the water for the operation of said plant within the area of the eternal ice of glaciers, comprising the steps of forming a water-containing reservoir within the eternal ice of a glacier, connecting said reservoir by a gravity pressure conduit to said plant located at a lower level than said reservoir, and depositing black mats capable of absorbing heat from solar radiation upon parts of the surface of said eternal ice within an area above said reservoir for transmitting said heat to said part so as to melt our shallow channels for collecting the water from melted ice and snow and for establishing a gravity flow conducting said water to said reservoir, said reservoir and said channels being deepened and enlarged during the warmer season by heat from solar radiation, by the erosion by the flow of water, and by the heat transfer from said water, thereby increasing the flow of water conducted to said reservoir.

11. A method of developing and erecting a powerplant and a system for collecting the water for the operation of said plant within the area of the eternal ice of glaciers, comprising the steps of forming a water-containing reservoir within the eternal ice of a glacier, connecting said reservoir by a gravity pressure conduit to said plant located at a lower level than said reservoir, and depositing black soot capable of absorbing heat from solar radiation upon parts of the surface of said eternal ice within an area above said reservoir for transmitting said heat to said part so as to melt out shallow channels for collecting the water from melted ice and snow and for establishing a gravity flow conducting said water to said reservoir, said reservoir and said channels being deepened and enlarged during the warmer season by heat from solar radiation, by the erosion by the flow of water, and by the heat transfer from said water, thereby increasing the flow of water conducted to said reservoir.

12. A method of developing and erecting a powerplant and a system for collecting the water for the operation of said plant within the area of the eternal ice of glaciers, comprising the steps of forming a water-containing reservoir within the eternal ice of a glacier connecting said reservoir by a gravity pressure conduit to said plant located at a lower level than said reservoir, and depositing dark crushed rock and gravel from the nearby mountains upon parts of the surface of said eternal ice within an area above said reservoir for transmitting the heat absorbed by said materials from solar radiation to said parts so as to melt out shallow channels for collecting the water from melted ice and snow and for establishing a gravity flow conducting said water to said reservoir, said reservoir and said channels being deepened and enlarged during the warmer season by heat from solar radiation, by the erosion by the flow of water, and by the heat transfer from said water, thereby increasing the flow of water conducted to said reservoir.

13. A method of developing and erecting a powerplant and a system for collecting the water for the operation of said plant within the area of the eternal ice of glaciers, comprising the steps of forming a water-containing reservoir within the eternal ice of a glacier, connecting said reservoir by a gravity pressure conduit to said plant located at a lower level than said reservoir, blackening crushed rock and gravel from the nearby mountains with soot, depositing said blackened materials upon parts of the surface of said eternal ice within an area above said reservoir for transmitting the heat absorbed by said materials from solar radiation to said part so as to melt out shallow channels for collecting the water from melted ice and snow and for establishing a gravity flow conducting said water to said reservoir, said reservoir and said channels being deepened and enlarged during the warmer season by heat from solar radiation, by the erosion by the flow of water, and by the heat transfer from said water, thereby increasing the flow of water conducted to said reservoir.

14. A method of developing and erecting a powerplant and a system for collecting the water for the operation of said plant within the area of the eternal ice of glaciers, comprising the steps of forming a water-containing reservoir within the eternal ice of a glacier, connecting said reservoir by a gravity pressure conduit to said plant located at a lower level than said reservoir, forming in the surface of the ice within an area above said reservoir a system of shallow channels for collecting water from a still higher area of the ice forming a watershed for supplying said channels with said water, some of said channels also being adapted to conduct said collected water under gravity to said reservoir and depositing means of a dark color at least upon parts of the surface of said watershed area for transmitting the heat absorbed by said means from solar radiation to said parts so as to increase the amount of water melted therefrom, said reservoir and said channels being deepened and enlarged during the warmer season by heat from solar radiation, by the erosion by the flow of water, and by the heat transfer from said water, thereby increasing the flow of water conducted to said reservoir.

References Cited

UNITED STATES PATENTS

| 1,585,182 | 5/1926 | Blankenship | 61—1 X |
| 2,455,234 | 11/1948 | Crick | 61—1 |

FOREIGN PATENTS

| 598,692 | 10/1959 | Italy. |

EARL J. WITMER, *Primary Examiner.*

U.S. Cl. X.R.

61—1